United States Patent
Ryne et al.

(10) Patent No.: US 12,054,194 B2
(45) Date of Patent: Aug. 6, 2024

(54) SYSTEMS AND METHODS FOR ACTIVE BLIND ZONE ASSIST

(71) Applicant: STEERING SOLUTIONS IP HOLDING CORPORATION, Saginaw, MI (US)

(72) Inventors: Zaki Ryne, Rochester Hills, MI (US); Farhad Bolourchi, Novi, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 355 days.

(21) Appl. No.: 17/347,687

(22) Filed: Jun. 15, 2021

(65) Prior Publication Data
US 2022/0396313 A1    Dec. 15, 2022

(51) Int. Cl.
*B62D 15/02* (2006.01)
*B62D 5/04* (2006.01)

(52) U.S. Cl.
CPC ....... *B62D 15/0265* (2013.01); *B62D 5/0463* (2013.01); *B62D 15/0255* (2013.01)

(58) Field of Classification Search
CPC .............. B62D 15/0265; B62D 5/0463; B62D 15/0255
USPC .......................................................... 701/41
See application file for complete search history.

(56) References Cited

U.S. PATENT DOCUMENTS

| 11,332,131 | B2* | 5/2022 | Park | G01S 13/87 |
| 2013/0223686 | A1* | 8/2013 | Shimizu | G08G 1/166 382/103 |
| 2018/0354510 | A1* | 12/2018 | Miyata | B60W 30/18163 |
| 2019/0225150 | A1* | 7/2019 | Nohl | G01S 13/58 |
| 2019/0377354 | A1* | 12/2019 | Shalev-Shwartz | G05D 1/247 |
| 2021/0107501 | A1* | 4/2021 | Monteil | A61B 5/6893 |

FOREIGN PATENT DOCUMENTS

| DE | 102016116963 A1 | 3/2018 | |
| DE | 102016224061 A1 | 6/2018 | |
| WO | WO-2018158642 A1 * | 9/2018 | B60W 30/08 |

* cited by examiner

*Primary Examiner* — Scott A Reinbold
(74) *Attorney, Agent, or Firm* — Dickinson Wright PLLC

(57) ABSTRACT

A method includes receiving, before a first time, a plurality of sensor values and identifying, based on the plurality of sensor values, a target vehicle in a blind zone of a host vehicle. The method also includes determining, at the first time, that the host vehicle is initiating a steering maneuver and identifying a plurality of time segments between the first time and a second time. The method also includes updating the plurality of sensor values and determining a heading angle of the target vehicle relative to the host vehicle. The method also includes estimating a position of the target vehicle at each time segment of the plurality of time segments and estimating, using each position of the target vehicle at each corresponding time segment of the plurality of time segments, a position of the target vehicle at the second time.

16 Claims, 5 Drawing Sheets

SYSTEMS AND METHODS FOR ACTIVE BLIND ZONE ASSIST

TECHNICAL FIELD

This disclosure related to vehicle active blind zone assist and, in particular systems and methods for cameraless active blind zone assist.

BACKGROUND

Vehicles, such as cars, trucks, sport utility vehicles, crossovers, mini-vans, marine craft, aircraft, all-terrain vehicles, recreational vehicles, or other suitable vehicles, are increasingly including blind zone assist systems. Such systems may be configured to use various sensor, including an image capturing device, such as a camera disposed proximate a front of a corresponding vehicle (e.g., a host vehicle). Typically, such systems are configured to warn an operator of the vehicle and avoid potential collision, in response to detected potential risk of collision during, for example, performance of a lane change.

In such systems, short-range sensors, such as radio detection and ranging (radar) sensors, housed on both sides of a rear bumper of the host vehicle may monitor the areas directly alongside and behind the host vehicle. The image capturing device (e.g., the camera) may be front facing and may be used to detect lane indicators and, based on the lane indicators, a controller of the vehicle may determine the position of a target vehicle at the blind zone of the host vehicle. Such position information of the target vehicle may be used by the controller during a lane change maneuver by the host vehicle to avoid collision between the host vehicle and the target vehicle.

SUMMARY

This disclosure relates generally to vehicle blind zone assist.

An aspect of the disclosed embodiments includes a method for active blind zone assist. The method includes receiving, before a first time, a plurality of sensor values from at least one sensor disposed proximate a rear portion of a host vehicle and identifying, based on the plurality of sensor values, a target vehicle in a blind zone of the host vehicle. The method also includes determining, at the first time, that the host vehicle is initiating a steering maneuver and identifying a plurality of time segments between the first time and a second time. The method also includes updating, using at least one transformation function, the plurality of sensor values and determining, using the updated plurality of sensor values, a heading angle of the target vehicle relative to the host vehicle. The method also includes estimating, based on the heading angle of the target vehicle relative to the host vehicle, a position of the target vehicle at each time segment of the plurality of time segments and estimating, using each position of the target vehicle at each corresponding time segment of the plurality of time segments, a position of the target vehicle at the second time.

In some embodiments, a system for active blind zone assist without using an image-capturing device includes a processor and a memory. The memory includes instructions that, when executed by the processor, cause the processor to: receive, before a first time, a plurality of sensor values from at least one sensor disposed proximate a rear portion of a host vehicle; identify, based on the plurality of sensor values, a target vehicle in a blind zone of the host vehicle; determine, at the first time, that the host vehicle is initiating a steering maneuver; identify a plurality of time segments between the first time and a second time; update, using at least one transformation function, the plurality of sensor values; determine, using the updated plurality of sensor values, a heading angle of the target vehicle relative to the host vehicle; estimate, based on the heading angle of the target vehicle relative to the host vehicle, a position of the target vehicle at each time segment of the plurality of time segments; and estimate, using each position of the target vehicle at each corresponding time segment of the plurality of time segments, a position of the target vehicle at the second time.

In some embodiments, an apparatus for active blind zone assist includes a processor and a memory. The memory includes instructions that, when executed by the processor, cause the processor to: receive, before a first time, a plurality of sensor values from at least one radio detection and ranging sensor disposed proximate a rear portion of a host vehicle; identify, based on the plurality of sensor values, a target vehicle in a blind zone of the host vehicle; determine, at the first time, that the host vehicle is initiating a steering maneuver; identify a plurality of time segments between the first time and a second time; update, using at least one transformation function, the plurality of sensor values; determine, by applying a linear regression to the updated plurality of sensor values, a heading angle of the target vehicle relative to the host vehicle; estimate, based on the heading angle of the target vehicle relative to the host vehicle, a position of the target vehicle at each time segment of the plurality of time segments; estimate, using each position of the target vehicle at each corresponding time segment of the plurality of time segments, a position of the target vehicle at the second time; determine, using, at least, the position of the target vehicle at the second time, a time to collision between the host vehicle and the target vehicle; and, in response to a determination that the time to collision is less than a threshold, applying a torque overlay to at least one motor of a steering system of the host vehicle to direct the host vehicle away from the target vehicle.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
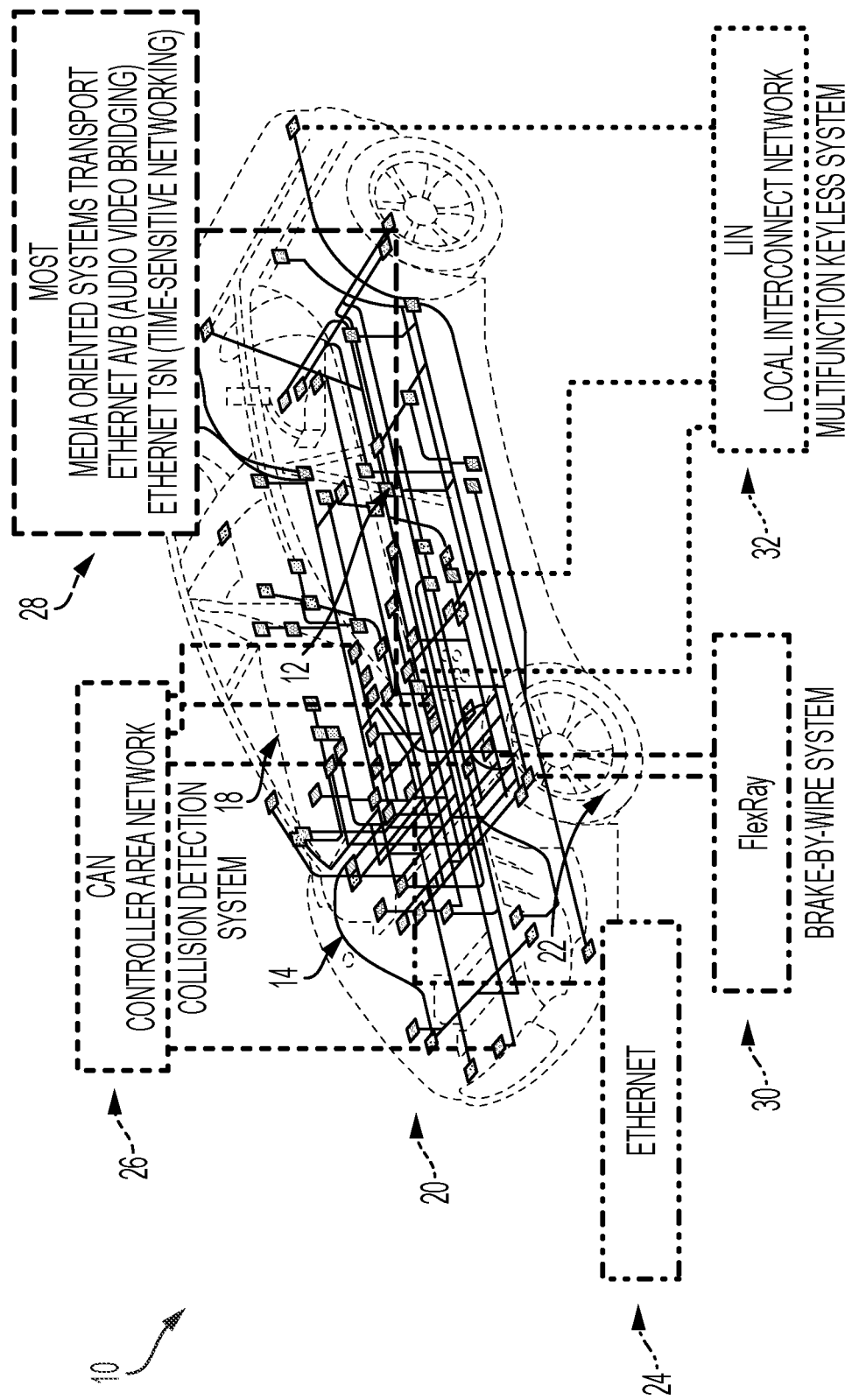
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, are increasingly including blind zone assist systems. Such systems may be configured to use various sensor, including an image capturing device, such as a camera disposed proximate a front of a corresponding vehicle (e.g., a host vehicle). Typically, such systems are configured to warn an operator of the vehicle and avoid potential collision, in response to detected potential risk of collision during, for example, performance of a lane change.

In such systems, short-range sensors, such as radio detection and ranging (radar) sensors, housed on both sides of a rear bumper of the host vehicle may monitor the areas directly alongside and behind the host vehicle. The image capturing device (e.g., the camera) may be front facing and may be used to detect lane indicators and, based on the lane indicators, a controller of the vehicle may determine the position of a target vehicle at the blind zone of the host vehicle. Such position information of the target vehicle may be used by the controller during a lane change maneuver by the host vehicle to avoid collision between the host vehicle and the target vehicle.

However, the performance of the image capturing device depends on the condition of the surrounding environment of the host vehicle (e.g., because the image capturing device may be a passive sensor). For example, fog, direct sunlight, dust on the image capturing device lens or covering the lane markers, heavy rain obstructing the image capturing device lens, snow on the image capturing device lens or covering the lane markers, faded or no lane markers on the road proximate the host vehicle, and or other conditions of the environment of the host vehicle may reduce the efficacy of the image capturing device (e.g., because the image capturing device may be incapable of capturing images of the environment of the host vehicle that are usable for identifying lane markers, other vehicles, and the like), which may diminish the efficacy of the blind zone assist feature of the host vehicle. Additionally, or alternatively, the image capturing device may experience a fault and/or a fault may occur in a communications path between the controller and the image capturing device. Further, some host vehicles may not include an image capturing device. Such systems may determine, using the image capturing device, a polynomial given as $markY=a_0+a_{1x}+a_{2x}^2+a_{3x}^3$. Such systems may use the polynomial to identify objects proximate the vehicle.

Accordingly, systems and methods, such as those described herein, that perform blind zone assist features without the use of an image capturing device, may be desirable. In some embodiments, the systems and methods described herein may be configured to provide blind zone assist using one or more sensors, such one or more radar sensors or other suitable sensors (e.g., without the use of a passive image capturing sensor or device).

In some embodiments, the systems and methods described herein may be configured to use a steering system of the host vehicle to, responsive to measured or sensed values of the one or more sensors, to avoid a collision and/or to mitigate consequences of a collision between the host vehicle and a target vehicle. The systems and methods described herein may be configured to corner sensors (e.g., radar or other suitable sensors disposed at or near each side of a rear portion of the host vehicle) to track an object (e.g., such as the target vehicle or other suitable object) at the blind zone of the host vehicle. The systems and methods described herein may be configured to predict the probable collision during steering maneuver performed by the host vehicle, using the measured or sensed values of the corner sensors of the host vehicle.

In some embodiments, the systems and methods described herein may be configured to receive, before a first time, a plurality of sensor values from at least one sensor disposed proximate a rear portion of a host vehicle. The at least one sensor may include at least one radar sensor. For example, the host vehicle may include respective radar sensors disposed on each side of a rear portion of the host vehicle. The host vehicle may include an electronic power steering system, a steer-by-wire steering system, or other suitable steering system.

The systems and methods described herein may be configured to identify, based on the plurality of sensor values, a target vehicle in a blind zone of the host vehicle. The systems and methods described herein may be configured to determine, at the first time, that the host vehicle is initiating a steering maneuver. The steering maneuver include a lane change maneuver or other suitable steering maneuver.

The systems and methods described herein may be configured to identify a plurality of time segments between the first time and a second time. The systems and methods described herein may be configured to update, using at least one transformation function, the plurality of sensor values. In some embodiments, the at least one transformation function includes a homogenous transformation matrix or other suitable transformation function. In some embodiments, the systems and methods described herein may be configured to apply a linear regression to the updated plurality of sensor values.

In some embodiments, the systems and methods described herein may be configured to determine, using the updated plurality of sensor values after application of the linear regression, a heading angle of the target vehicle relative to the host vehicle. The systems and methods described herein may be configured to estimate, based on the heading angle of the target vehicle relative to the host vehicle, a position of the target vehicle at each time segment of the plurality of time segments. The systems and methods described herein may be configured to estimate, using each position of the target vehicle at each corresponding time segment of the plurality of time segments, a position of the target vehicle at the second time.

In some embodiments, the systems and methods described herein may be configured to estimate, using the updated plurality of sensor values and a constant velocity model, a velocity of the target vehicle relative to the host vehicle. The systems and methods described herein may be configured to determine a velocity of the host vehicle. The systems and methods described herein may be configured to estimate, using a constant turn radius model, a position of the host vehicle at each of the time segments of the plurality of time segments.

In some embodiments, the systems and methods described herein may be configured to determine, for each time segment of the plurality of time segments, a time to collision between the host vehicle and the target vehicle based on one or more of the estimated velocity of the target vehicle, the velocity of the host vehicle, the position of the target vehicle at each time segment of the plurality of time segments, the position of the host vehicle at each time segment of the plurality of time segments, other suitable information, or any combination thereof.

In some embodiments, the systems and methods described herein may be configured to determine whether the time to collision for a respective time segment of the plurality of time segments is less than a threshold. The systems and methods described herein may be configured to, in response to a determination that the time to collision for the respective time segment of the plurality of time segments is less than the threshold, initiate at least one steering control operation. The at least one steering control operating includes applying a torque overlay to at least one motor of a steering system of the host vehicle, other suitable steering control operation, or a combination thereof. The steering control operation (e.g., including the application of the torque overlay to the at least one motor of the steering system) may be configured to direct the host vehicle away from the target vehicle.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
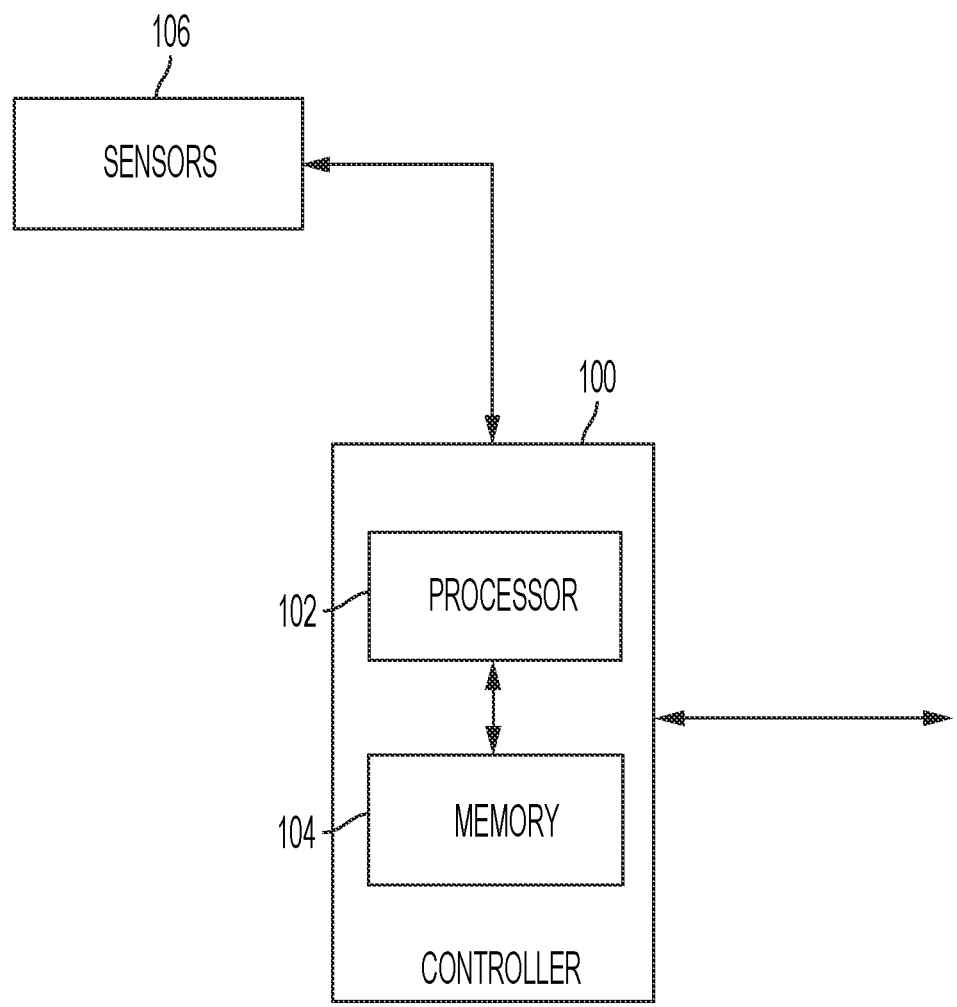
FIG. 2 generally illustrates an active blind zone assist system including a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof In some embodiments, the sensors 106 may include one or more image capturing devices (e.g., such as a camera), one or more audio input devices (e.g. such as a microphone), one or more global positioning devices, one or more proximity sensing devices, one or more radar sensors, one or more light detecting and ranging sensors, one or more ultrasonic sensors, other suitable sensors or devices, or a combination thereof.

In some embodiments, the controller 100 may be configured to perform blind zone assist features of the vehicle 10. For example, the controller 100 may receive measured or sensed values from the sensors 106. As described, the sensors 106 may include one or more radar sensors disposed proximate a rear portion of the vehicle 10. For example, a first sensor 106 may be disposed on a first side of the vehicle 10 at or near a first rear corner of the vehicle 10 and a second sensor 106 may be disposed on a second side, opposite the first side, of the vehicle 10 at or near a second rear corner of the vehicle 10 opposite the first corner. It should be understood that, while a first and second sensor are described, the vehicle 10 may include any suitable number of sensors 106 or other suitable sensors. The controller 100 may use the measured or sense values of the sensors 106 to determine one or more positions of an object proximate the vehicle 10. The controller 100 may selectively control aspects of steering system of the vehicle 10 to avoid or mitigate consequences of a collision with the object, based on the measured or sensed values of the sensors 106.

Figure 3A:
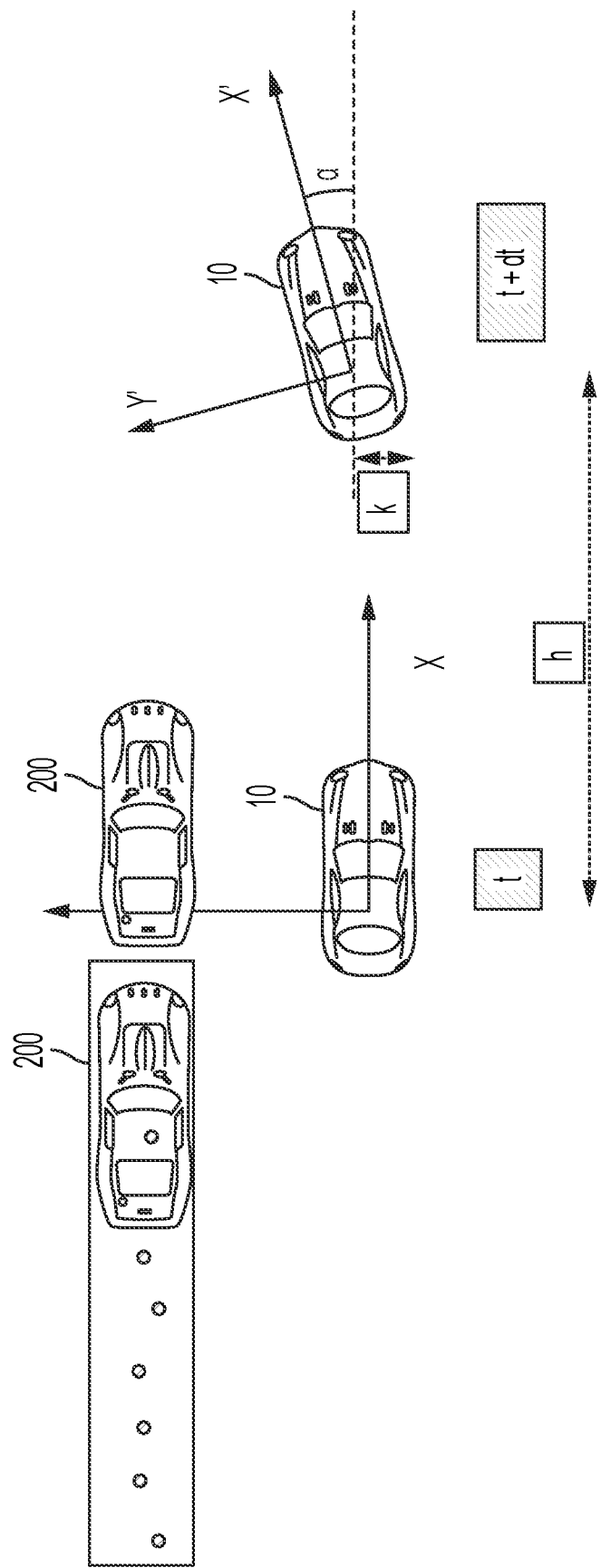
FIGS. 3A and 3B generally illustrate a vehicle lane change maneuver according to the principles of the present disclosure.

In some embodiments, at a time t (e.g., which may be referred to as a first time), as is generally illustrated in FIG. 3A, the controller 100 may track (e.g., prior to time t), using values received from the sensors 106, one or more positions of a target vehicle 200. In some embodiments, the controller 100 may use a ring buffer or other suitable mechanism to track the values from the sensors 106 indicating the positions of the target vehicle 200. The controller 100, at a time t+dt (e.g., which may be referred to as a second time), determine (e.g., based on input provided by various components of the steering system or other suitable component of the vehicle 10), that the vehicle 10 (e.g., which may be referred to as the host vehicle 10 or the host vehicle) is initiating a steering maneuver, such as a lane change maneuver or other suitable steering maneuver.

At the time t+dt, the controller 100 may update the values received from the sensors 106 (e.g., and the corresponding positions or states of the target vehicle 200) using one or more transformation functions. For example, the controller 100 may update the values of the sensors 106 using any suitable transformation function, including, but not limited to, a homogeneous transformation matrix, which may be defined as:

$$\begin{bmatrix} X' \\ Y' \\ 1 \end{bmatrix} = \begin{bmatrix} \cos\alpha & -\sin\alpha & h \\ \sin\alpha & \cos\alpha & k \\ 0 & 0 & 1 \end{bmatrix} \begin{bmatrix} X \\ Y \\ 1 \end{bmatrix}$$

Where h indicated vehicle speed at time t+dt of the vehicle 10, k is a constant set to 0 (e.g., or other suitable value), and a indicates a yaw rate of the vehicle 10 at time t+dt. The vehicle speed, ya rate, and/or other suitable characteristics of the vehicle 10 may be provided to the controller 100 may various sensors or components of the vehicle 10.

In some embodiments, the controller 100 may, after the values of the sensors 106 (e.g., and the corresponding states or positions of the target vehicle 200) are updated, apply a linear regression to the updated values of the sensors 106 (e.g., and the corresponding states or positions of the target vehicle 200). The controller 100 may calculate, using the result of the application of the linear regression to the updated values of the sensors 106, a relative heading angle of the target vehicle 200 (e.g., relative to the vehicle 10). The calculation of the relative heading angle of the target vehicle 200 may be deined as:

$$\Theta = \tan^{-1} \frac{\text{last } Y - \text{first } Y}{\text{last } X - \text{first } X}$$

Where y indicates a component of a positon of the vehicle 10 along the y-axis, as is generally illustrated in FIG. 3A, and x indicates a component of the position of the vehicle 10 along the x-axis, as is generally illustrated in FIG. 3A.

In some embodiments, the controller 100 may be configured to predict or estimate a position of the target vehicle 200 and a position of the vehicle 10, for each time segment of a plurality of time segments between the time t and the time t+dt. For example, the time segments may correspond subdivisions of the time between the time t and the time t+dt. The controller 100 may estimate the position of the target vehicle 200 for each time segment and the position of the vehicle 10 or each time segment using values of the sensors 106, the result of the application of the liner regression to the values of the sensors 106, the heading angle of the target vehicle 200 relative to the vehicle 10, other suitable information, or a combination thereof.

In some embodiments, the controller 100 may avoid a potential collision and/or mitigate the consequences of the potential collision between the target vehicle 200 and the vehicle 10 based on the positions of the target vehicle 200 at each time segment, the positions of the vehicle 10 at each time segment, a speed of the target vehicle 200 relative to the vehicle 10, the speed of the vehicle 10, other suitable information, or a combination thereof. The controller 100 may determine the speed of the target vehicle 200 relative to the vehicle 10. The speed of the target vehicle 200 relative to the vehicle 10 may be defined as:

$$VehSpd_{TV} = SQRT[(RelSpd.x)^2 + (RelSpd.y)^2]$$

Where $VehSpd_{TV}$ corresponds to the speed of the target vehicle 200, RelSpdX corresponds to an X component of the relative (e.g., to the vehicle 10) speed of the target vehicle 200, and RelSpdY corresponds to a Y component of the relative (e.g., to the vehicle 10) speed of the target vehicle 200. The controller 100 may determine the speed of the vehicle 10 based on one more values received from one or more various sensors of the vehicle 10. The controller 100 may calculate, for the vehicle 10:

$$Radius, R = \frac{VehSpd}{YawRate}$$

$$S'y, EV = R - R.Cos(d\Phi)$$

The controller 100 may further calculate, at a steady state, YawRate, $r=[(V/L)*\{1/(1+KV2/57.3Lg)\}]*\delta$, $\delta$ corresponds to the steering angle (degrees), V corresponds to the speed of the vehicle 10, L corresponds to the wheelbase (feet), K corresponds to the understeer gradient (degrees/g), g corresponds to the gravitational acceleration constant (e.g., 32.2 (feet/second$^2$)), R corresponds to the associated circular motion, S'yEV corresponds to a Y component of a travel distance between t and dt, S'xEV corresponds to a X component of a travel distance between t and dt, and d$\Phi$ (e.g., heading angle)=r·dt.

Figure 3B:
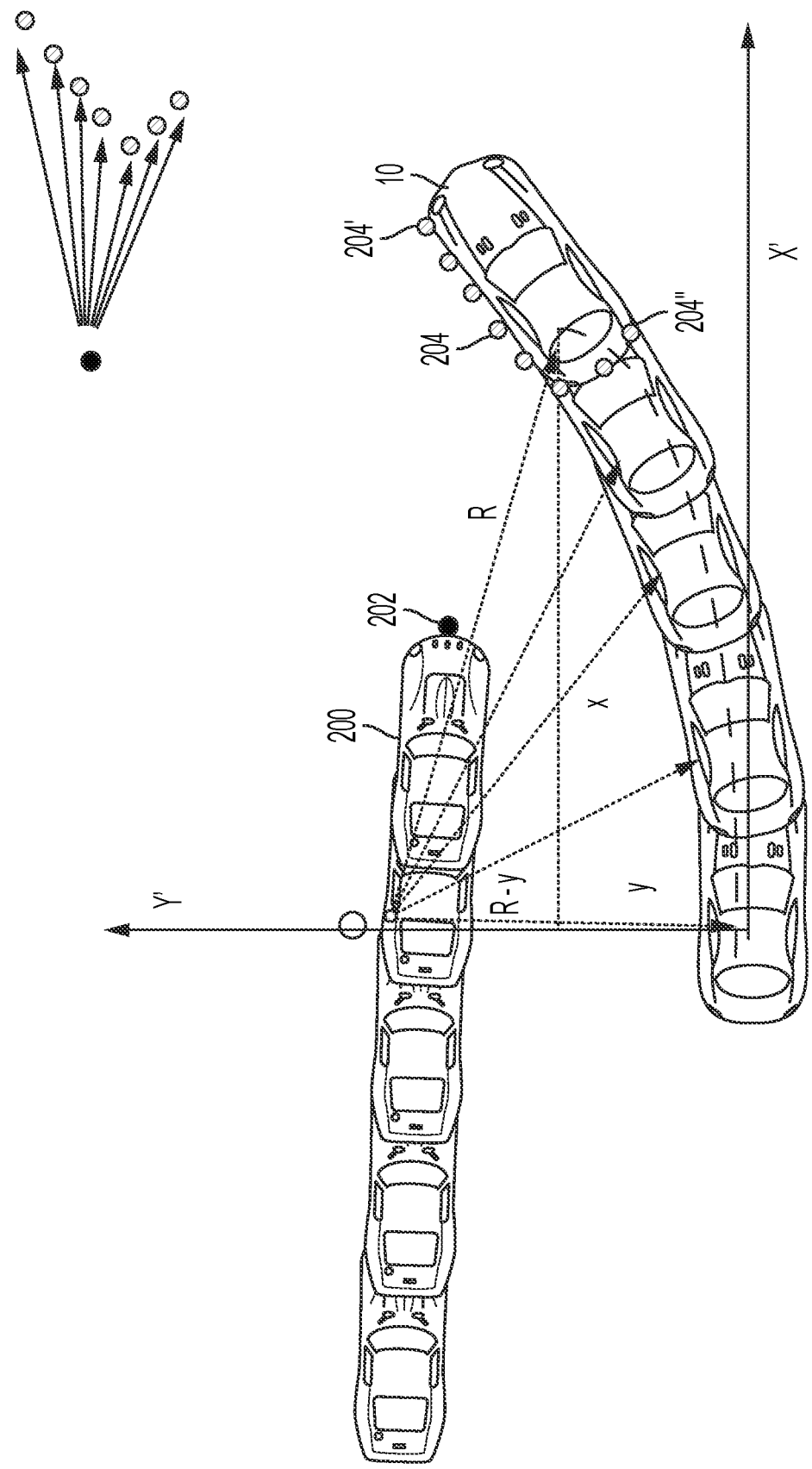

The controller 100 may determine a distance between a front point 202 of the target vehicle 200 and various points 204 of the vehicle 10, as is generally illustrated in FIG. 3B. In some embodiments, the controller 100 may predict the positions of the vehicle 10 (e.g., and or distances between the vehicle 10 and the target vehicle 200) at each time segment using a constant radius model. In some embodiments, the controller 100 may determine the positions of the target vehicle 200 (e.g., and or distances between the vehicle 10 and the target vehicle 200) for each time segment using a constant velocity mode. For example, the controller 100 may determine a distance between the front point 202 of the target vehicle 200 and a first upper corner point 204' of the vehicle 10. The distance between the front point 202 and the first upper corner point 204' of the vehicle 10 may be defined as:

$$S'_{y,EV,firstupper} = S'_{y,EV} + (d1)*\sin(d\Phi) + (w)*\cos(d\Phi)$$

$$S'_{x,EV,firstupper} = S'_{x,EV} + (d1)*\cos(d\Phi) + (w)*(-\sin(d\Phi))$$

Which may define a new position of the first upper corner point 204' of the vehicle 10.

The controller 100 may determine a distance between the front point 202 and a second lower corner point 204" of the vehicle 10. The distance between the front point 202 and the second lower corner point 204" may be defined as:

$$S'_{y,EV,secondlower} = S'_{y,EV} + (-d2)*\sin(d\Phi) + (-w)*\cos(d\Phi)$$

$$S'_{x,EV,secondlower} = S'_{x,EV} + (-d2)*\cos(d\Phi) + (-w)*(-s(d\Phi))$$

Which may define a new positon of second lower corner point 204" of the vehicle 10.

Where, d1 corresponds to a distance between a center of a rear axle of the vehicle 10 and a front end of the vehicle 10, d2 corresponds to a distance between the center of the rear axle of the vehicle 10 and a rear end of the vehicle 10, and w corresponds to half the width of the vehicle 10.

In some embodiments, the controller 100 may determine a path of the target vehicle 200 based on the vehicle speed of the target vehicle 200 relative to the vehicle 10 and the heading angle of the target vehicle 200 relative to the vehicle 10. The path of the target vehicle 200 may be defined as:

$$S'_{x,TV} = S'_{0x} + VehSpd_{TV} \cdot Cos(headngAngle_{TV}) \cdot dt$$

$$S'_{y,TV} = S'_{0y} + VehSpd_{TV} \cdot Sin(headAngle_{TV}) \cdot dt$$

The controller 100 may determine whether a predicted distance between the target vehicle 200 and the vehicle 10 is less than a threshold distance. If the controller 100 determines that the predicted distance between the target vehicle 200 and the vehicle 10 is equal to or greater than the threshold distance, the controller 100 may allow the vehicle 10 to perform the steering maneuver.

Alternatively, if the controller 100 determines that the predicted distance between the target vehicle 200 and the vehicle 10 is less than the threshold distance, the controller 100 may initiate at least one steering control operation to avoid or mitigate the consequences of a potential collision indicated by the predicted distance between the target vehicle 200 and the vehicle 10 being less than the threshold distance. For example, the controller 100 may determine a suitable amount of toque overlay to be applied to at least one motor of the steering system of the vehicle 10 to direct the vehicle 10 away from the target vehicle 200. The controller 100 may apply the torque overlay to the motor of the steering system. The vehicle 10 may change paths to avoid colliding with the target vehicle 200. Additionally, or alternatively, the controller 100 may initiate other control steering operations in addition to or instead of applying the torque overlay, such as providing an indication to the operator of the vehicle 10 that a collision is possible (e.g., using one or more output devices of the vehicle 10)>

In some embodiments, controller 100 receive, before a first time, a plurality of sensor values from at least one sensor 106 disposed proximate a rear portion of a host vehicle 10. The at least one sensor may include at least one radar sensor. For example, the host vehicle 10 may include respective radar sensors disposed on each side of a rear portion of the host vehicle 10. The host vehicle 10 may include an electronic power steering system, a steer-by-wire steering system, or other suitable steering system.

The controller 100 may identify, based on the plurality of sensor values, a target vehicle 200 in a blind zone of the host vehicle 10. The controller 100 may determine, at the first time, that the host vehicle 10 is initiating a steering maneuver. The steering maneuver include a lane change maneuver or other suitable steering maneuver.

The controller 100 may identify a plurality of time segments between the first time and a second time. The controller 100 may update, using at least one transformation function, the plurality of sensor values. In some embodiments, the at least one transformation function includes a homogenous transformation matrix or other suitable transformation function. In some embodiments, controller 100 may apply a linear regression to the updated plurality of sensor values.

In some embodiments, the controller 100 may determine, using the updated plurality of sensor values after application of the linear regression, a heading angle of the target vehicle 200 relative to the host vehicle 10. The controller 100 may estimate, based on the heading angle of the target vehicle 200 relative to the host vehicle 10, a position of the target vehicle 200 at each time segment of the plurality of time segments. The controller 100 may estimate, using each position of the target vehicle 200 at each corresponding time segment of the plurality of time segments, a position of the target vehicle 200 at the second time.

In some embodiments, the controller 100 may estimate, using the updated plurality of sensor values and a constant velocity model, a velocity of the target vehicle 200 relative to the host vehicle 10. The controller 100 may determine a velocity of the host vehicle 10. The controller 100 may estimate, using a constant turn radius model, a position of the host vehicle 10 at each of the time segments of the plurality of time segments.

In some embodiments, the controller 100 may determine, for each time segment of the plurality of time segments, a time to collision between the host vehicle 10 and the target vehicle 200 based on one or more of the estimated velocity of the target vehicle 200, the velocity of the host vehicle 10, the position of the target vehicle 200 at each time segment of the plurality of time segments, the position of the host vehicle 10 at each time segment of the plurality of time segments, other suitable information, or any combination thereof.

In some embodiments, the controller 100 may determine whether the time to collision for a respective time segment of the plurality of time segments is less than a threshold. The controller 100 may, in response to a determination that the time to collision for the respective time segment of the plurality of time segments is less than the threshold, initiate at least one steering control operation. The at least one steering control operating may include applying a torque overlay to at least one motor of a steering system of the host vehicle 10, other suitable steering control operation, or a combination thereof. The steering control operation (e.g., including the application of the torque overlay to the at least one motor of the steering system) may be configured to direct the host vehicle 10 away from the target vehicle 200.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
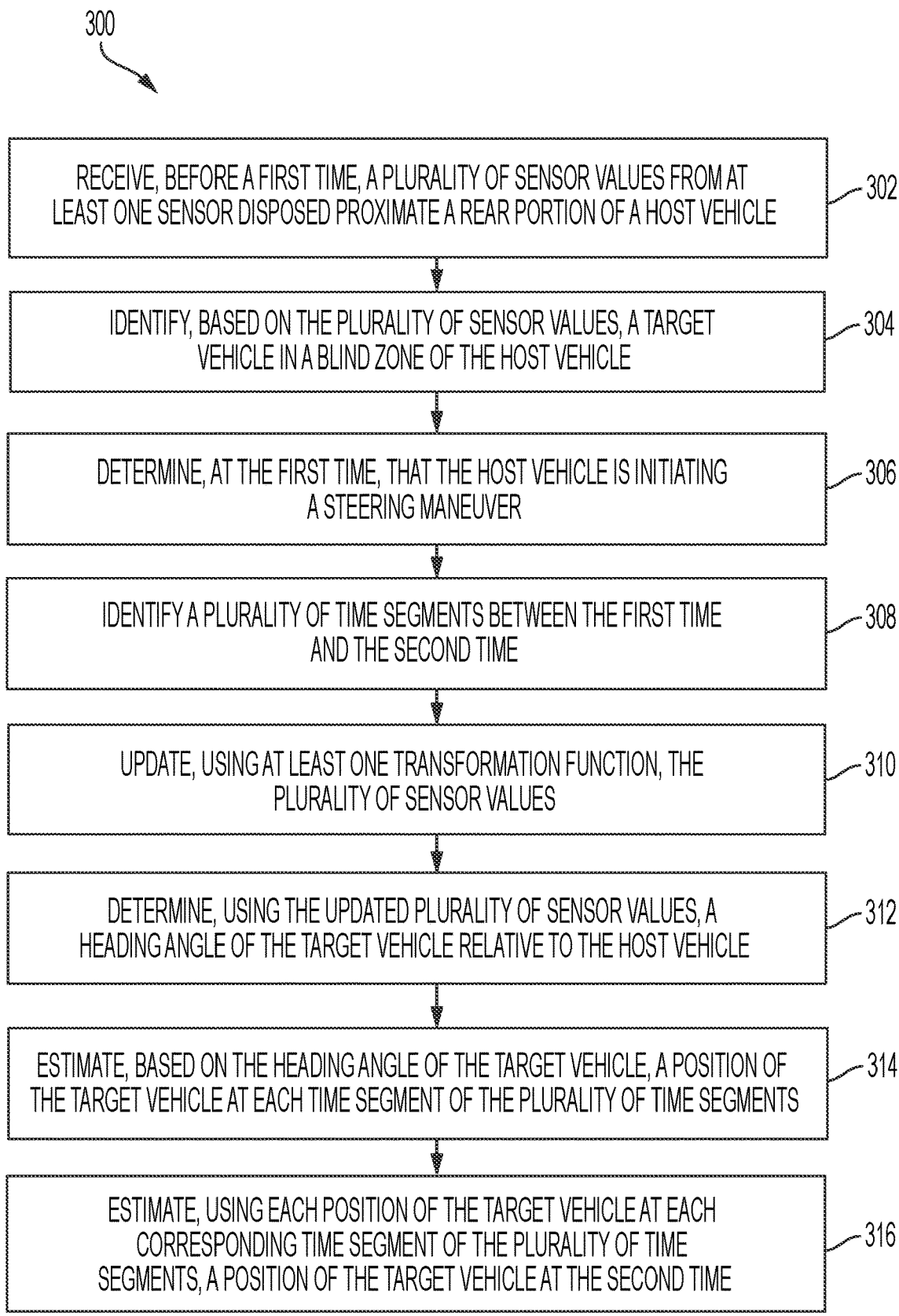
FIG. 4 is a flow diagram generally illustrating an active blind zone assist method according to the principles of the present disclosure.

FIG. 4 is a flow diagram generally illustrating an active blind zone assist method 300 according to the principles of the present disclosure. At 302, the method 300 receives, before a first time, a plurality of sensor values from at least one sensor disposed proximate a rear portion of a host vehicle. For example, the controller 100 may receive the plurality of sensor values from the sensors 106.

At 304, the method 300 identifies, based on the plurality of sensor values, a target vehicle in a blind zone of the host vehicle. For example, the controller 100 may identify the target vehicle 200 in the blind zone of the vehicle 10 based on the plurality of sensor values.

At 306, the method 300 determines, at the first time, that the host vehicle is initiating a steering maneuver. For example, the controller 100 may determine that the vehicle 10 is initiating a steering maneuver.

At 308, the method 300 identifies a plurality of time segments between the first time and a second time. For example, the controller 100 may identify the plurality of time segments between the first time and the second time.

At 310, the method 300 updates, using at least one transformation function, the plurality of sensor values. For example, the controller 100 may update the plurality of sensor values using the at least one transformation function.

At 312, the method 300 determines, using the updated plurality of sensor values, a heading angle of the target vehicle relative to the host vehicle. For example, the controller 100 may determine, using the updated plurality of sensor values, the heading angle of the target vehicle 200 relative to the vehicle 10.

At 314, the method 300 estimates, based on the heading angle of the target vehicle relative to the vehicle 10, a position of the target vehicle at each time segment of the plurality of time segments. For example, the controller 100 may estimate, based on the heading angle of the target vehicle 200 relative to the vehicle 10, a position of the target vehicle 200 at east time segment of the plurality of time segments.

At 316, the method 300 estimates, using each position of the target vehicle at each corresponding time segment of the plurality of time segments, a position of the target vehicle at the second time. For example, the controller 100 may estimate, using each position of the target vehicle 200 at each corresponding time segment of the plurality of time segments, a position of the target vehicle at the second time.

In some embodiments, the method 300 may estimate, using the updated plurality of sensor values and a constant velocity model, a velocity of the target vehicle relative to the host vehicle. For example, the controller 100 may estimate, using the updated plurality of sensor values and a constant velocity model, a velocity of the target vehicle 200 relative to the vehicle 10.

In some embodiments, the method 300 may determine a velocity of the host vehicle and may estimate, using a constant turn radius model, a position of the host vehicle at each of the time segments of the plurality of time segments. For example, the controller 100 may determine a velocity of the vehicle 10 and may estimate, using a constant turn radius model, a position of the vehicle 10 at each of the time segments of the plurality of time segments.

In some embodiments, the method 300 may determine, for each time segment of the plurality of time segments, a time to collision between the host vehicle and the target vehicle based on at least one of the estimated velocity of the target vehicle, the velocity of the host vehicle, the position of the target vehicle at each time segment of the plurality of time segments, and the position of the host vehicle at each time segment of the plurality of time segments. For example, the controller 100 may determine, for each time segment of the plurality of time segments, a time to collision between the vehicle 10 and the target vehicle 200 based on at least one of the estimated velocity of the target vehicle 200, the velocity of the vehicle 10, the position of the target vehicle 200 at each time segment of the plurality of time segments, and the position of the vehicle 10 at each time segment of the plurality of time segments.

In some embodiments, the method 300 may determine whether the time to collision for a respective time segment of the plurality of time segments is less than a threshold. For example, the controller 100 may determine whether the time to collision for a respective tie segment of the plurality of time segments is less than the threshold.

In some embodiments, the method 300 may, in response to a determination that the time to collision for the respective time segment of the plurality of time segments is less than the threshold, initiate at least one steering control operation. For example, the controller 100 may, in response to a determination that the time to collision for the respective time segment of the plurality of time segments is less than the threshold, initiate at least one steering control operation.

In some embodiments, a method for active blind zone assist includes receiving, before a first time, a plurality of sensor values from at least one sensor disposed proximate a rear portion of a host vehicle and identifying, based on the plurality of sensor values, a target vehicle in a blind zone of the host vehicle. The method also includes determining, at the first time, that the host vehicle is initiating a steering maneuver and identifying a plurality of time segments between the first time and a second time. The method also includes updating, using at least one transformation function, the plurality of sensor values and determining, using the updated plurality of sensor values, a heading angle of the target vehicle relative to the host vehicle. The method also includes estimating, based on the heading angle of the target vehicle relative to the host vehicle, a position of the target vehicle at each time segment of the plurality of time segments and estimating, using each position of the target vehicle at each corresponding time segment of the plurality of time segments, a position of the target vehicle at the second time.

In some embodiments, the at least one transformation function includes a homogenous transformation matrix. In some embodiments, determining, using the updated plurality of sensor values, the heading angle of the target vehicle relative to the host vehicle includes applying a linear regression to the updated plurality of sensor values. In some embodiments, the method also includes estimating, using the updated plurality of sensor values and a constant velocity model, a velocity of the target vehicle relative to the host vehicle. In some embodiments, the method also includes determining a velocity of the host vehicle and estimating, using a constant turn radius model, a position of the host vehicle at each of the time segments of the plurality of time segments. In some embodiments, the method also includes determining, for each time segment of the plurality of time segments, a time to collision between the host vehicle and the target vehicle based on at least one of the estimated velocity of the target vehicle, the velocity of the host vehicle, the position of the target vehicle at each time segment of the plurality of time segments, and the position of the host vehicle at each time segment of the plurality of time segments. In some embodiments, the method also includes determining whether the time to collision for a respective time segment of the plurality of time segments is less than a threshold and, in response to a determination that the time to collision for the respective time segment of the plurality of time segments is less than the threshold, initiating at least one steering control operation. In some embodiments, the at least one steering control operating includes applying a torque overlay to at least one motor of a steering system of the host vehicle, wherein the torque overlay is configured to direct the host vehicle away from the target vehicle. In some embodiments, the at least one sensor includes at least one radio detection and ranging sensor. In some embodiments, the steering maneuver include a lane change maneuver. In some embodiments, the host vehicle includes an electronic power steering system. In some embodiments, the host vehicle includes a steer-by-wire steering system.

In some embodiments, a system for active blind zone assist without using an image-capturing device includes a processor and a memory. The memory includes instructions that, when executed by the processor, cause the processor to: receive, before a first time, a plurality of sensor values from at least one sensor disposed proximate a rear portion of a host vehicle; identify, based on the plurality of sensor values, a target vehicle in a blind zone of the host vehicle; determine, at the first time, that the host vehicle is initiating a steering maneuver; identify a plurality of time segments between the first time and a second time; update, using at least one transformation function, the plurality of sensor values; determine, using the updated plurality of sensor values, a heading angle of the target vehicle relative to the host vehicle; estimate, based on the heading angle of the target vehicle relative to the host vehicle, a position of the target vehicle at each time segment of the plurality of time segments; and estimate, using each position of the target vehicle at each corresponding time segment of the plurality of time segments, a position of the target vehicle at the second time.

In some embodiments, the at least one transformation function includes a homogenous transformation matrix. In some embodiments, the instructions further cause the processor to determine, using the updated plurality of sensor values, the heading angle of the target vehicle relative to the host vehicle by at least applying a linear regression to the updated plurality of sensor values. In some embodiments, the instructions further cause the processor to determine, for each time segment of the plurality of time segments, a time to collision between the host vehicle and the target vehicle based on at least one of an estimated velocity of the target vehicle, a velocity of the host vehicle, the position of the target vehicle at each time segment of the plurality of time segments, and a position of the host vehicle at each time segment of the plurality of time segments. In some embodiments, the instructions further cause the processor to determine whether the time to collision for a respective time segment of the plurality of time segments is less than a threshold and, in response to a determination that the time to collision for the respective time segment of the plurality of time segments is less than the threshold, initiate at least one steering control operation. In some embodiments, the at least one steering control operating includes applying a torque overlay to at least one motor of a steering system of the host vehicle, wherein the torque overlay is configured to direct the host vehicle away from the target vehicle. In some embodiments, the at least one sensor includes at least one radio detection and ranging sensor.

In some embodiments, an apparatus for active blind zone assist includes a processor and a memory. The memory includes instructions that, when executed by the processor, cause the processor to: receive, before a first time, a plurality of sensor values from at least one radio detection and ranging sensor disposed proximate a rear portion of a host vehicle; identify, based on the plurality of sensor values, a target vehicle in a blind zone of the host vehicle; determine, at the first time, that the host vehicle is initiating a steering maneuver; identify a plurality of time segments between the first time and a second time; update, using at least one transformation function, the plurality of sensor values; determine, by applying a linear regression to the updated plurality of sensor values, a heading angle of the target vehicle relative to the host vehicle; estimate, based on the heading angle of the target vehicle relative to the host vehicle, a position of the target vehicle at each time segment of the plurality of time segments; estimate, using each position of the target vehicle at each corresponding time segment of the plurality of time segments, a position of the target vehicle at the second time; determine, using, at least, the position of the target vehicle at the second time, a time to collision between the host vehicle and the target vehicle; and, in response to a determination that the time to collision is less than a threshold, applying a torque overlay to at least one motor of a steering system of the host vehicle to direct the host vehicle away from the target vehicle.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for active blind zone assist, the method comprising:
   receiving, before a first time, a plurality of sensor values from at least one sensor disposed proximate a rear portion of a host vehicle;
   identifying, based on the plurality of sensor values, a target vehicle in a blind zone of the host vehicle;
   determining, at the first time, that the host vehicle is initiating a steering maneuver;
   identifying a plurality of time segments between the first time and a second time;
   updating, using at least one transformation function, the plurality of sensor values;
   determining, using the updated plurality of sensor values, a heading angle of the target vehicle relative to the host vehicle;
   estimating, based on the heading angle of the target vehicle relative to the host vehicle, a position of the target vehicle at each time segment of the plurality of time segments;
   estimating, using each position of the target vehicle at each corresponding time segment of the plurality of time segments, a position of the target vehicle at the second time; and
   in response to determining, based on the position of the target vehicle at the second time, that a distance to collision between the host vehicle and the target vehicle is less than a threshold, controlling at least one motor of a steering system of the host vehicle to direct the host vehicle away from the target vehicle.

2. The method of claim 1, wherein the at least one transformation function includes a homogenous transformation matrix.

3. The method of claim 1, wherein determining, using the updated plurality of sensor values, the heading angle of the target vehicle relative to the host vehicle includes applying a linear regression to the updated plurality of sensor values.

4. The method of claim 1, further comprising estimating, using the updated plurality of sensor values and a constant velocity model, a velocity of the target vehicle relative to the host vehicle.

5. The method of claim 4, further comprising:
   determining a velocity of the host vehicle; and
   estimating, using a constant turn radius model, a position of the host vehicle at each of the time segments of the plurality of time segments.

6. The method of claim 5, further comprising:
   determining, for each time segment of the plurality of time segments, a distance to collision between the host vehicle and the target vehicle based on at least one of the estimated velocity of the target vehicle, the velocity of the host vehicle, the position of the target vehicle at each time segment of the plurality of time segments, and the position of the host vehicle at each time segment of the plurality of time segments.

7. The method of claim 1, wherein the at least one sensor includes at least one radio detection and ranging sensor.

8. The method of claim 1, wherein the steering maneuver include a lane change maneuver.

9. The method of claim 1, wherein the host vehicle includes an electronic power steering system.

10. The method of claim 1, wherein the host vehicle includes a steer-by-wire steering system.

11. A system for active blind zone assist without using an image-capturing device, the system comprising:
   a processor; and
   a memory including instructions that, when executed by the processor, cause the processor to:
      receive, before a first time, a plurality of sensor values from at least one sensor disposed proximate a rear portion of a host vehicle;
      identify, based on the plurality of sensor values, a target vehicle in a blind zone of the host vehicle;
      determine, at the first time, that the host vehicle is initiating a steering maneuver;
      identify a plurality of time segments between the first time and a second time;
      update, using at least one transformation function, the plurality of sensor values;
      determine, using the updated plurality of sensor values, a heading angle of the target vehicle relative to the host vehicle;
      estimate, based on the heading angle of the target vehicle relative to the host vehicle, a position of the target vehicle at each time segment of the plurality of time segments;
      estimate, using each position of the target vehicle at each corresponding time segment of the plurality of time segments, a position of the target vehicle at the second time; and
      in response to determining, based on the position of the target vehicle at the second time, that a distance to collision between the host vehicle and the target vehicle is less than a threshold, control at least one motor of a steering system of the host vehicle to direct the host vehicle away from the target vehicle.

12. The system of claim 11, wherein the at least one transformation function includes a homogenous transformation matrix.

13. The system of claim 11, wherein the instructions further cause the processor to determine, using the updated plurality of sensor values, the heading angle of the target vehicle relative to the host vehicle by at least applying a linear regression to the updated plurality of sensor values.

14. The system of claim 11, wherein the instructions further cause the processor to:
   determine, for each time segment of the plurality of time segments, a distance to collision between the host vehicle and the target vehicle based on at least one of an estimated velocity of the target vehicle, a velocity of the host vehicle, the position of the target vehicle at each time segment of the plurality of time segments, and a position of the host vehicle at each time segment of the plurality of time segments.

15. The system of claim 11, wherein the at least one sensor includes at least one radio detection and ranging sensor.

16. An apparatus for active blind zone assist, the apparatus comprising:
   a processor; and
   a memory including instructions that, when executed by the processor, cause the processor to:
      receive, before a first time, a plurality of sensor values from at least one radio detection and ranging sensor disposed proximate a rear portion of a host vehicle;
      identify, based on the plurality of sensor values, a target vehicle in a blind zone of the host vehicle;
      determine, at the first time, that the host vehicle is initiating a steering maneuver;
      identify a plurality of time segments between the first time and a second time;
      update, using at least one transformation function, the plurality of sensor values;
      determine, by applying a linear regression to the updated plurality of sensor values, a heading angle of the target vehicle relative to the host vehicle;
      estimate, based on the heading angle of the target vehicle relative to the host vehicle, a position of the target vehicle at each time segment of the plurality of time segments;
      estimate, using each position of the target vehicle at each corresponding time segment of the plurality of time segments, a position of the target vehicle at the second time;
      determine, using, at least, the position of the target vehicle at the second time, a distance to collision between the host vehicle and the target vehicle; and
      selectively control at least one motor of a steering system of the host vehicle to direct the host vehicle away from the target vehicle based on a comparison of the distance to collision and a threshold distance.

* * * * *